United States Patent [19]
Finney et al.

[11] Patent Number: 5,560,191
[45] Date of Patent: Oct. 1, 1996

[54] JUMBO BALE ROTATING TABLE FOR A HAY BALER

[76] Inventors: Denzel R. Finney; Kelly D. Finney, both of P.O. Box 131, Fort Sumner, N.M. 88119

[21] Appl. No.: 465,018

[22] Filed: Jun. 5, 1995

[51] Int. Cl.$^6$ .................................................. A01D 75/04
[52] U.S. Cl. .................... 56/474; 414/744.7; 414/779; 100/45; 100/179; 100/188 R
[58] Field of Search ................... 56/474, 343, 449, 56/432, 433, 451, 475, 476, 480; 414/779, 754, 744.4, 744.6, 744.7; 100/179, 188 R, 45

[56] References Cited

U.S. PATENT DOCUMENTS

| | | | |
|---|---|---|---|
| 2,853,171 | 9/1958 | Matthews | 414/754 X |
| 3,161,008 | 12/1964 | Shepley et al. | 100/188 R X |
| 3,286,854 | 11/1966 | Crawford | 414/779 X |
| 3,476,267 | 11/1969 | Clarke | 414/779 |
| 3,497,085 | 2/1970 | Jay et al. | 214/6 |
| 3,820,453 | 6/1974 | Tipton | 100/188 R |
| 4,150,756 | 4/1979 | Butler | 414/40 |
| 5,024,152 | 6/1991 | Girard | 100/188 R |

*Primary Examiner*—Terry Lee Melius
*Assistant Examiner*—Heather Chun Schackelford
*Attorney, Agent, or Firm*—Robert K. Rhea

[57] ABSTRACT

A hay bale turntable for angularly rotating a rectangular jumbo size hay bale 90° about its longitudnal axis while lowering the bale as it is received from a baler chamber to the surface of the earth is formed by a rigid bale support frame connected with the rearward end of a hay baler frame below the exit end of the hay baler bale chamber. A bale lowering arm frame is pivotally connected with the support frame for vertical pivoting movement toward and away from the surface of the earth. The arm frame supports a bale receiving platform having a bearing centrally interposed between the platform and the arm frame for angular rotation of the platform as the arm frame lowers it toward the surface of the earth by a fluid pressure cylinder connected with the support frame and arm frame. The cylinder is actuated for pivoting the arm frame by a fluid pressure pilot valve on the platform triggered by an overlying bale. Simultaneous with lowering of the bale toward the surface of the earth a tether rod connecting the platform with the support frame angularly rotates the bale 90° about its longitudinal axis.

7 Claims, 2 Drawing Sheets

JUMBO BALE ROTATING TABLE FOR A HAY BALER

BACKGROUND OF THE INVENTION

1. Field of the Invention

This invention relates to hay balers forming relatively large size rectangular hay bales, for example, 4×4×8 feet and more particularly to a turntable for angularly rotating a bale 90° about its longitudinal axis as it leaves a baler chamber.

Rectangular jumbo hay bales which may approach a ton or more in mass are conventionally discharged longitudinally from the rearward end of a baler chamber which is an inconvenient position for the bale to be picked up by a bale loader and moved to a place of storage off the meadow or field. This invention provides an apparatus which is attached to the baler and performs the bale rotating function.

2. Description of the Prior Art

The prior art bale pick up, rotating and stacking apparatus generally relates to conventional small size bales of approximately 16×16×48 inches in length.

U.S. Pat. No. 3,497,085 issued Feb. 24, 1970 to Jay et al for BALE ELEVATOR CHUTE CONSTRUCTION and U.S. Pat. No. 4,150,756 issued Apr. 24, 1979 to Butler for BALE WAGON are believed representative of the state-of-the-art. The apparatus of each of these patents pick up a hay bale lying on one of its sides, lengthwise relative to the path of travel, as it leaves a baler and the path of travel of the bale pick up wagon which pulls the bale up a chute to a stack position, rotating the bale or bales as necessary to form tied tiers of a stacked block of such hay bales. These and other prior art patents are believed incapable of handling jumbo size hay bales. Jumbo size hay bales are picked up singularly and moved to a place of storage in side by side relation rather than being stacked, as is common with the smaller size hay bales.

SUMMARY OF THE INVENTION

A hay bale turntable having a support frame is connected with the rearward frame end of a hay baler. The frame includes a pair of arms pivoting vertically about a horizontal axis and supports a platform substantially horizontal and parallel with the bottom wall of a rearwardly open hay baler chamber.

The platform longitudinally receives a jumbo size hay bale when discharged from the baler chamber. Rearward movement of the hay bale triggers a spring return fluid pressure pilot valve which actuates a cylinder to pivot the arms rearwardly and downwardly. A tether connecting the platform with the support frame angularly rotates the platform substantially 90° about its central axis as the platform is lowered toward the surface of the earth. Depositing the bale on the surface of the earth releases the fluid pressure pilot and activates a fluid pressure cylinder to extend its piston rod and elevate the arms and platform to bale receiving position behind the baler chamber.

The principal object of this invention is to provide a turntable for angularly rotating a jumbo size hay bale substantially 90° and dispose its longitudinal axis transverse to the direction of travel of a hay baler while lowering the bale from a bale chamber exit to the surface of the earth without damage to the hay bale.

DESCRIPTION OF THE PREFERRED EMBODIMENTS

Figure 1:
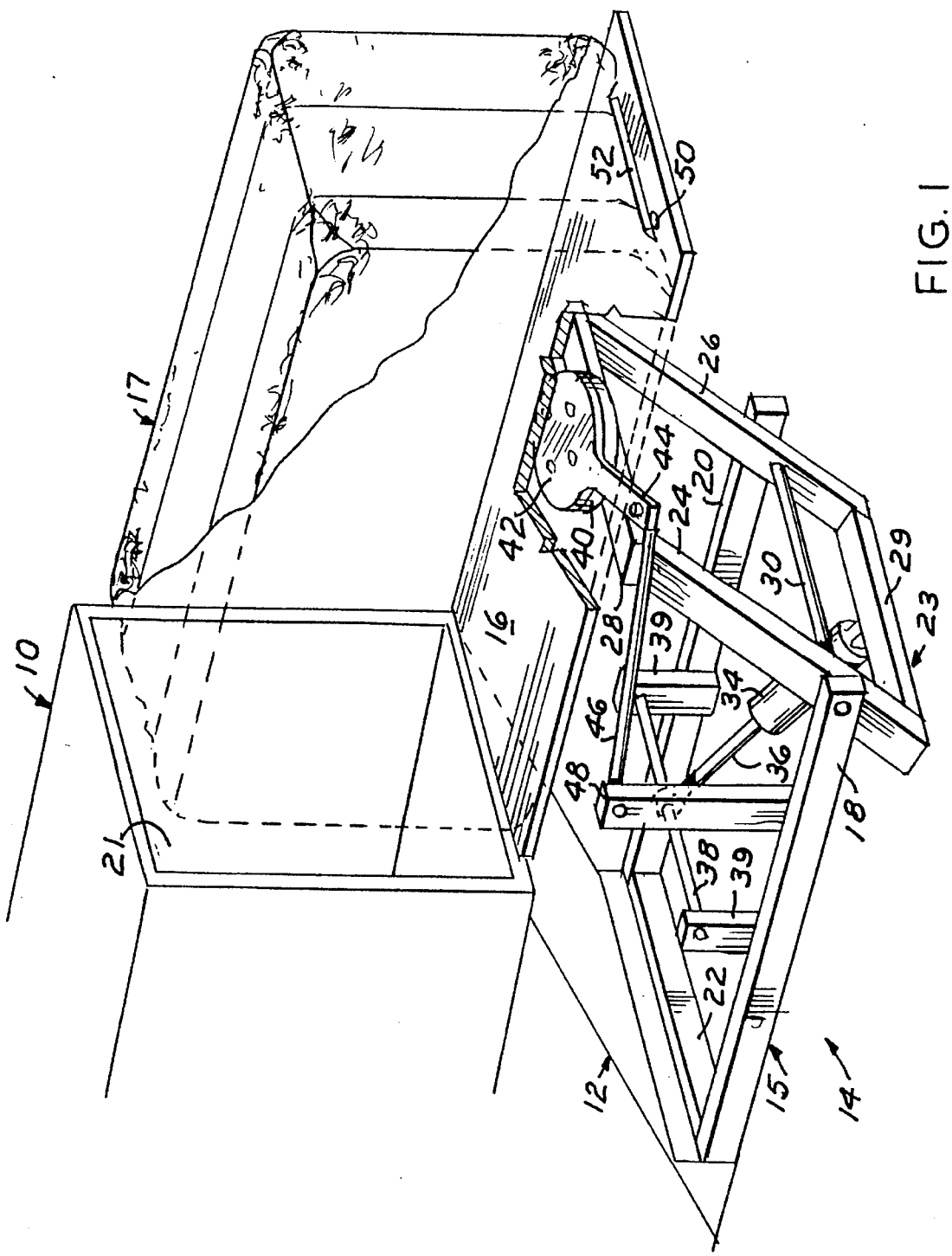
FIG. 1 is a fragmentary isometric view of the bale turntable illustrating a hay bale on a platform by solid and dotted lines; and, FIG. 2 is a similar isometric view illustrating the platform in bale rotated and lowered position, the bale being omitted for clarity.
Figure 2:
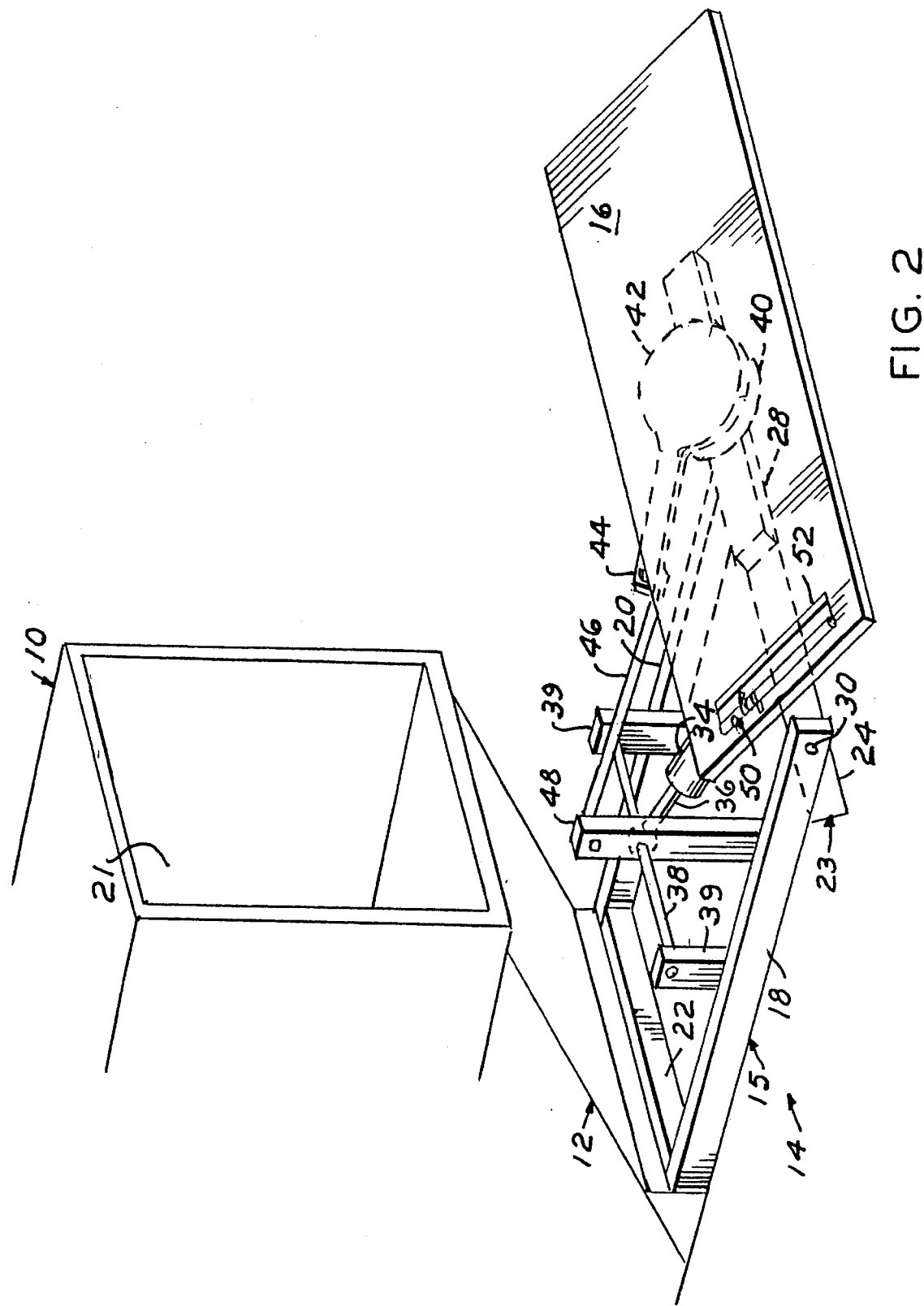

Like characters of reference designate like parts in those figures of the drawings in which they occur.

The reference numeral 10 indicates the rearward open end portion of a bale chamber and adjacent frame 12 in turn supporting a bale turntable 14.

The turntable 14 comprises a rigid frame means 15 supporting an elongated bale receiving platform 16 extending horizontally rearward from the bottom surface of the bale chamber 10 for receiving a jumbo size hay bale 17 longitudinally discharged from the bale chamber.

The support frame means 15 comprises a pair of parallel side rails 18 and 20 connected at their forward ends by an end member 22 secured to the baler frame members 12 for supporting the side rails 18 and 20 in a rearwardly projecting substantially horizontal position and in underlying relation with respect to the rearward opening 21 of the baler chamber.

A pair of parallel rearwardly and upwardly inclined arm means 23 including a pair of spaced-apart arms 24 and 26, connected at their upper and lower ends by cross members 28 and 29, are pivotally supported at their depending end portions by an axle 30 projecting horizontally through the rearward end portions of the frame side rails 18 and 20 for vertical pivoting movement of the arms about the horizontal axis of the axle 30.

A fluid pressure operated cylinder 34 has its piston end connected with the depending cross member 29 and its piston rod 36 connected with an anchor rod 38 extending transversely of the support frame 15 between a pair of posts 39 respectively secured to the frame side rails 18 and 20 for pivoting the upper end portions of a pair of arms 24 and 26 toward and away from the surface of the earth, as presently explained.

A bearing means 40 is centrally interposed between the top cross member 28 and the undersurface of the platform 16. The bearing means 40 includes a bearing plate 42 rigidly secured to the platform 16 and having an arm 44 projecting laterally beyond one side of the platform 16. An elongated tether rod 46 is pivotly connected at its respective end portions, as by universal joints not shown, with the end portion of the bearing arm 44 opposite the bearing 40 and the upper end of a standard 48 secured to the frame side member 18 intermediate its ends.

A spring return fluid pressure pilot valve has its push button 50 projecting above the top surface of the platform end portion opposite the baler chamber is triggered for actuating the pressure cylinder 34 for pivoting the arm means 23 and lowering the platform 16, as presently explained, by the bale 17 depressing a trigger panel 52 normally spring biased upwardly out of contact with the pilot push button 50.

OPERATION

Operation is believed obvious from the above description. Briefly stated, assuming the turntable apparatus 14 has been installed as described hereinabove and a bale 17 is not on the platform 16, forward movement of the baler forms a hay bale 17 which is projected rearwardly out of the bale chamber opening 21. The rearward end portion of the bale 17 depresses the trigger panel 52 and the pilot valve push button 50 to actuate the pressure cylinder 34 which pivots the upper end portion of the arm means 23, platform and hay bale toward the surface of the earth. Simultaneously with this movement the tether rod 46 angularly rotates the platform 16 and bale 17 about the axis of the bearing 40 disposing the longitudinal axis of the platform substantially parallel with the transverse rearward end of the baler chamber and in spaced relation with respect to the surface of the earth. The mass of the bale moves it off of the platform releasing the trigger panel 52 and pilot push button 50 to permit the cylinder 46 to extend its piston rod and lift the arm means and platform to the position of FIG. 1 and simultaneously the tether rod 46 rotates the platform to its position of FIG. 1 in cooperative alignment rearwardly of the baler chamber.

Obviously the invention is susceptible to changes or alterations without defeating its practicability. Therefore, I do not wish to be confined to the preferred embodiment shown in the drawings and described herein.

I claim:

1. A bale turntable for a hay baler having a baler frame and having a rearwardly open bale discharging chamber, comprising:

bale support frame means secured to the baler frame and projecting horizontally rearward in underlying relation with respect to the bale chamber;

elongated arm means pivotally connected with the support frame for vertical pivoting movement about a horizontal axis toward and away from the surface of the earth;

a platform supported by said arm means and having an elongated top surface extending rearwardly in cooperative aligned bale receiving relation with respect to the bale chamber;

bearing means connected between said platform and said arm means permitting angular rotative movement of said platform relative to said arm means;

fluid pressure means including a cylinder for pivoting said arm means toward and away from the surface of the earth in response to a hay bale on said platform; and, tether rod means extending between and connected with the platform and said support frame permitting angularly rotating said platform substantially 90° about a vertical axis and relative to the arm means during movement of the arm means toward and away from the surface of the earth.

2. The bale turntable according to claim 1 in which the fluid pressure means further includes:

a fluid pressure pilot valve push button projecting above the platform top surface opposite the bale chamber; and, a trigger panel pivotally secured to the platform top surface for depressing the push button and activating said cylinder in response to a hay bale overlying the platform and trigger panel.

3. The bale turntable according to claim 2 in which the arm means includes:

an axle extending transversely with respect to the direction of hay baler travel and horizontally supported by the support frame;

a pair of spaced-apart arms journalled by respective end portions of said axle; and, upper and lower cross members extending between and connected with said arms.

4. The bale turntable according to claim 3 in which the bearing means further includes:

a bearing secured to said upper cross member, said bearing having a top plate secured to the platform and having a bearing arm projecting latterally of said platform.

5. The bale turntable according to claim 4 in which the support frame means includes:

a pair of laterally spaced-apart side rails having forward end portions secured to said baler frame and having rearward end portions supporting said axle.

6. The bale turntable according to claim 5 in which the tether rod means includes:

an upright standard secured at one end portion to one said side rail; and, an elongated rod pivotally connected at the other end portion with said standard and the bearing plate arm.

7. The bale turntable according to claim 6 in which the fluid pressure means includes:

a pair of posts secured to said side rails in transversely aligned relation;

an anchor rod extending between said posts; and, said cylinder including a fluid pressure operated cylinder having a piston rod at one end pivotally secured to said anchor rod and having its end other end pivotally secured to said lower cross member.

\* \* \* \* \*